United States Patent
Che et al.

(10) Patent No.: US 7,876,519 B2
(45) Date of Patent: Jan. 25, 2011

(54) SELF-SPINNING DISK BULK ERASURE FOR HARD DISK ASSEMBLY

(75) Inventors: Carl Xiaodong Che, Saratoga, CA (US); Keung Youn Cho, San Jose, CA (US); Soo-Youl Hong, Santa Clara, CA (US); Shuo-Hao Chen, Cupertino, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 196 days.

(21) Appl. No.: 12/335,822

(22) Filed: Dec. 16, 2008

(65) Prior Publication Data
US 2010/0149677 A1    Jun. 17, 2010

(51) Int. Cl.
*G11B 5/03* (2006.01)
*H01F 13/00* (2006.01)
(52) U.S. Cl. .................... 360/66; 361/149; 361/267
(58) Field of Classification Search .......... None
See application file for complete search history.

(56) References Cited

U.S. PATENT DOCUMENTS

2005/0073766 A1* 4/2005 Price et al. ............... 360/66
2007/0014044 A1* 1/2007 Kitamura et al. .......... 360/66
2008/0013245 A1* 1/2008 Schultz et al. ............. 361/149

OTHER PUBLICATIONS

Fast Erase for Direct Access Storage Devices, Feb. 1, 1994, IBM Technical Disclosure Bulletin, vol. 37, Issue No. 2A, pp. 419-420.*

\* cited by examiner

*Primary Examiner*—Daniell L Negrón
*Assistant Examiner*—Regina N Holder
(74) *Attorney, Agent, or Firm*—Ben J. Yorks; Irell & Manella LLP

(57) ABSTRACT

A method for erasing a disk of a hard disk drive. The method includes moving the hard disk drive adjacent to an erasure head that emanates a magnetic field. The magnetic field and moving hard disk drive cause a disk of the hard disk drive to spin under a Lorentz force created by the magnetic field and moving disk. The magnetic field is applied by the erasure head for a duration that causes erasure of the entire disk. The spindle motor is not activated during the entire process. Not activating the spindle motor eliminates any Faraday coupling from the erasure head into the motor.

7 Claims, 2 Drawing Sheets

SELF-SPINNING DISK BULK ERASURE FOR HARD DISK ASSEMBLY

BACKGROUND OF THE INVENTION

1. Field of the Invention

The present invention relates to erasing a disk of a hard disk drive.

2. Background Information

Hard disk drives contain a plurality of magnetic heads that are coupled to rotating disks. The heads write and read information by magnetizing and sensing the magnetic fields of the disk surfaces. The heads are mounted to an actuator arm assembly that has a voice coil motor. The voice coil motor can move the heads across the surfaces of the disks. The disks typically have embedded servo information that is used to control the position of the heads. The disks are spun by a spindle motor that is mounted to a base plate of the disk drive.

For various reasons it is necessary to bulk erase the entire surfaces of the disks. Bulk erasing includes erasure of both data and servo. It is desirable to erase the magnetic disk without removing the disk from the disk drive assembly. Having to remove the disks significantly increases the time required to bulk erase the drive.

The disks can be bulk erased with the write heads of the disk drive but this requires movement of the heads along the entire disk surfaces. Another approach is to place the disks adjacent to a powerful erasure head that can erase a large area of the disk surfaces. The spindle motor spins the disks so that the entire disk surfaces are exposed to the magnetic field of the erasure head. The strong magnetic field of the erasure head can become coupled to the spindle motor and create a counteractive Lorentz force that slows down, and possibly stops, the spindle motor. The current to the spindle motor must be increased to overcome the drag of the Lorentz force created by the erasure head. High currents can potentially damage the spindle motor.

BRIEF SUMMARY OF THE INVENTION

A method for erasing a disk of a hard disk drive that includes moving the hard disk drive adjacent to an erasure head that emanates a magnetic field. The magnetic field and moving hard disk drive cause a disk of the hard disk drive to spin. The magnetic field is applied for a duration that causes erasure of the disk.

DETAILED DESCRIPTION

Disclosed is a method for erasing a disk of a hard disk drive. The method includes moving the hard disk drive adjacent to an erasure head that emanates a magnetic field. The magnetic field and moving hard disk drive cause a disk of the hard disk drive to spin under a Lorentz force created by the magnetic field and moving disk. The magnetic field is applied by the erasure head for a duration that causes erasure of the entire disk. The spindle motor is not activated during the entire process. Not activating the spindle motor eliminates any Faraday coupling from the erasure head into the motor. This eliminates the Lorentz force drag created in prior art methods.

Figure 1:
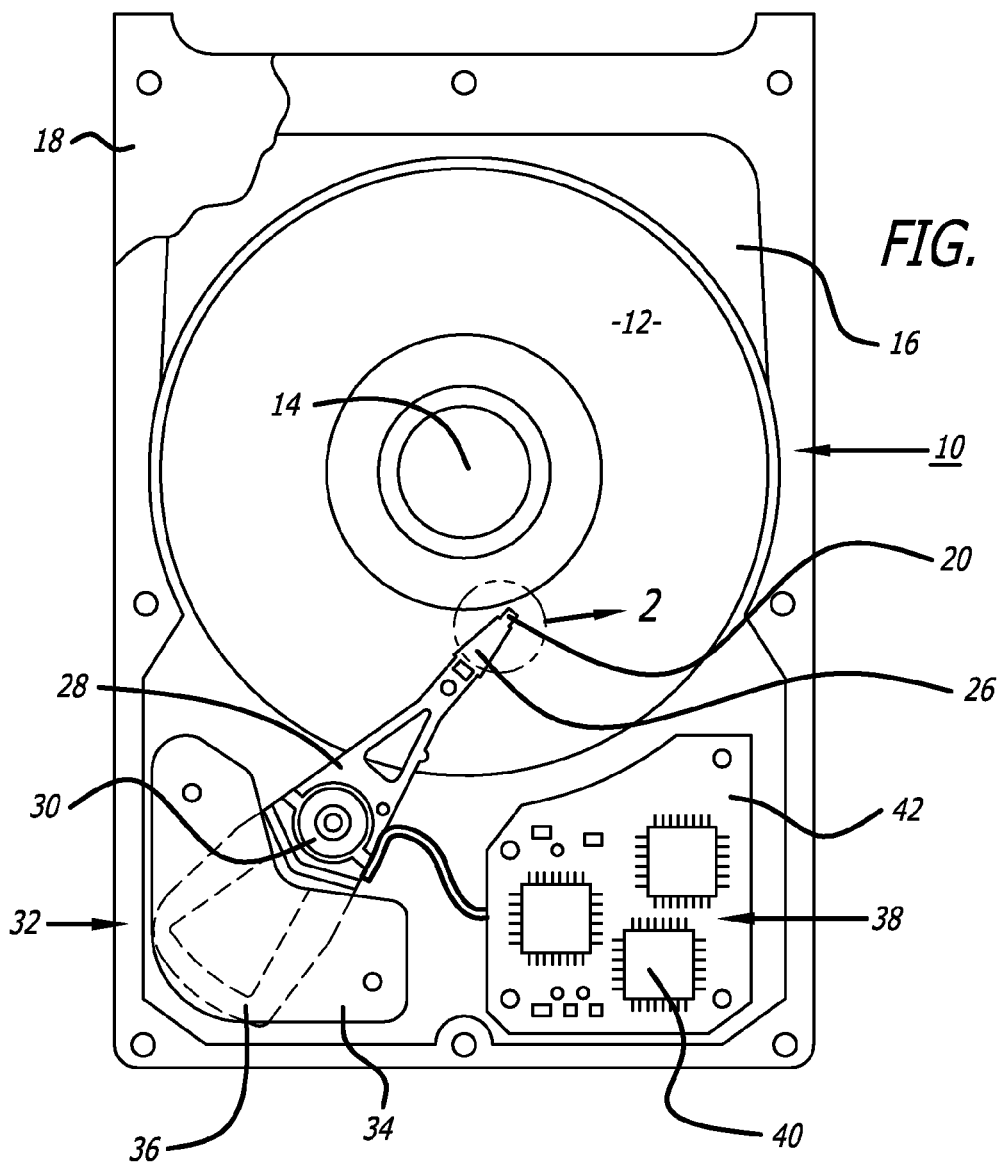
FIG. 1 is a top view of an embodiment of a hard disk drive.

Referring to the drawings more particularly by reference numbers, FIG. 1 shows an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

Figure 2:
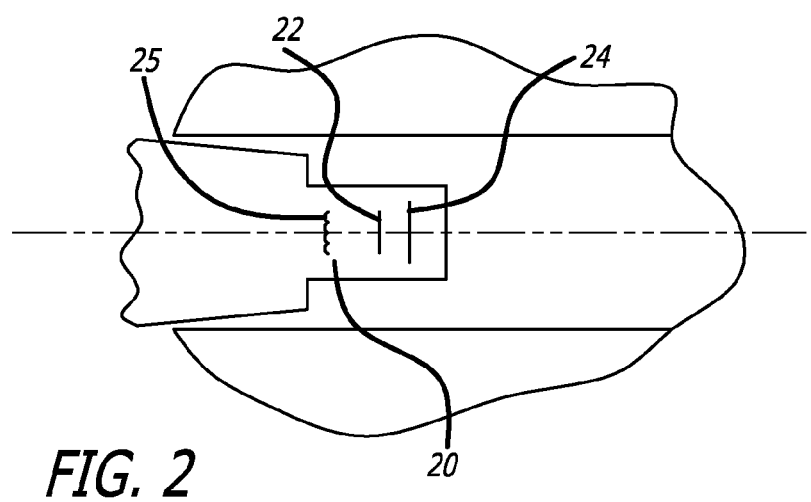
FIG. 2 is an illustration of a head of the disk drive.

The disk drive 10 may include a plurality of heads 20 located adjacent to the disks 12. As shown in FIG. 2 the heads 20 may have separate write 22 and read elements 24. The write element 22 magnetizes the disk 12 to write data. The read element 24 senses the magnetic fields of the disks 12 to read data. By way of example, the read element 24 may be constructed from a magneto-resistive material that has a resistance which varies linearly with changes in magnetic flux. Each head may include a heater element 25. A current can be provided to the heater elements to expand the heads and vary the head flying height. These types of heads are commonly referred to as fly-on-demand ("FOD") heads.

Referring to FIG. 1, each head 20 may be gimbal mounted to a flexure arm 26 as part of a head gimbal assembly (HGA). The flexure arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes a plurality of integrated circuits 40 coupled to a printed circuit board 42. The printed circuit board 40 is coupled to the voice coil 32, heads 20 and spindle motor 14 by wires (not shown).

Figure 3:
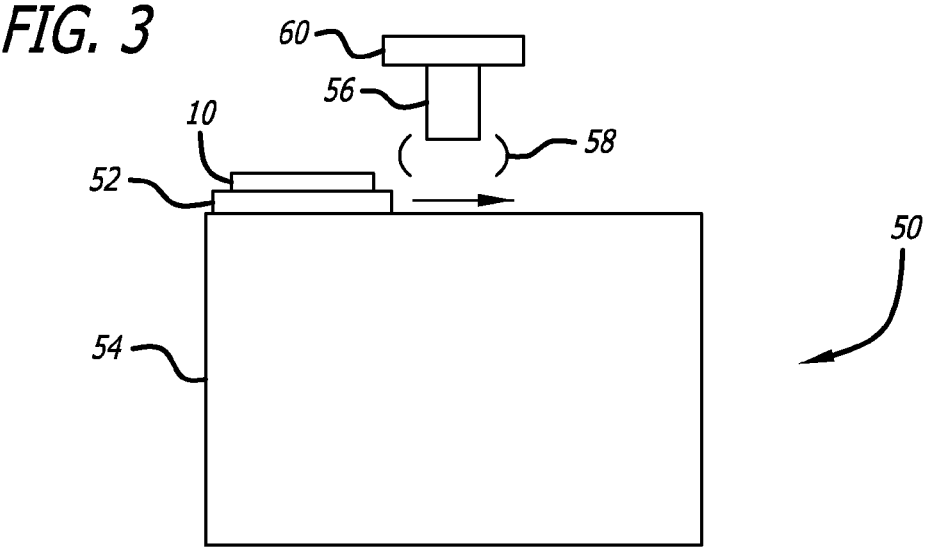
FIG. 3 is an illustration showing a side view of a test stand to erase the disk drive.
Figure 4:
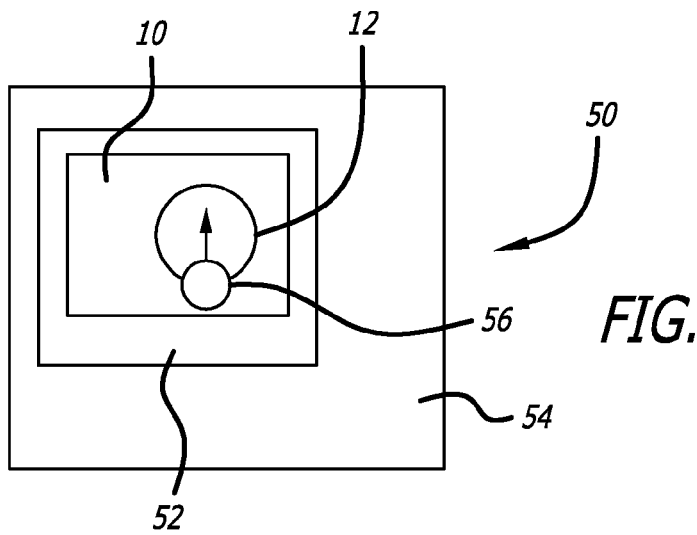
FIG. 4 is an illustration showing a top view of the test stand.

FIGS. 3 and 4 show a test stand 50 that is used to bulk erase the disk 12 of the drive 10. The test stand 50 includes a moving stage 52 coupled to a table 54. The moving stage 52 is constructed to hold a disk drive 10. The cover of the drive 10 is typically removed to exposed the disk 12. The test stand 50 also includes an erasure head 56. The erasure head 56 emanates a relatively strong magnetic field 58. The erasure head 56 may be mounted to a head moving stage 60.

The stage 52 moves the disk drive 10 to a position adjacent to the erasure head 56. The disk 12 is constructed from a metal substrate covered with various iron magnetic materials. The moving metal disk 12 interacts with the magnetic field 58 to create a Lorentz force the causes rotation of the disk 12. Once the disk 12 is spinning, the erasure head 56 produces a magnetic field for a time duration sufficient to erase the disk surfaces 12. The stage 60 can move the erasure head as indicated by the arrow in FIG. 4 to insure that the entire disk surface is erased.

Figure 5:
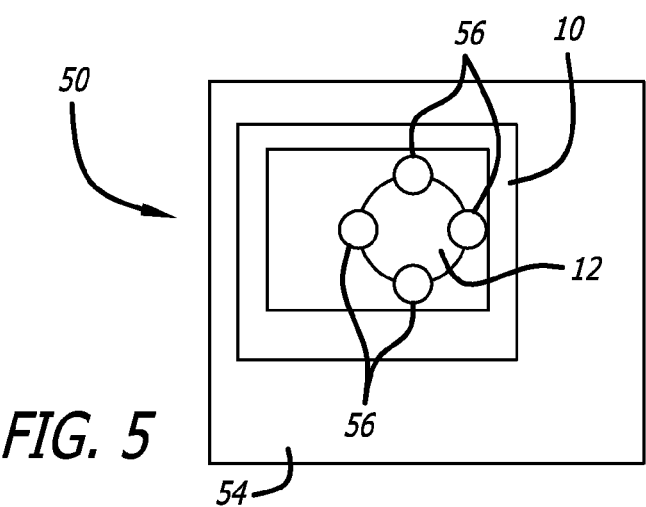
FIG. 5 is an illustration showing a top view of an alternate embodiment of the test stand.

FIG. 5 shows an alternate embodiment wherein the test stand 50' has four erasure heads 56 equally spaced about the stand 50'. The additional erasure heads 56 can create additional Lorentz torque for spinning the disk 12. The additional heads 56 can also reduce the time required to erase the disk 12.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

For example, the stage 60 can be modified so that the erasure head 56 moves in an opposite direct of the stage 52 to increase the relative movement between the head 56 and the drive 10.

What is claimed is:

1. A method for erasing a disk of a hard disk drive, comprising:
   moving a hard disk drive adjacent to an erasure head that emanates a magnetic field, wherein the magnetic field and moving hard disk drive cause a disk of the hard disk drive to spin; and,
   applying the magnetic field for a duration that causes erasure of the disk.

2. The method of claim 1, wherein the hard disk drive is moved adjacent to a plurality of erasure heads.

3. The method of claim 1, wherein the erasure head is moved relative to the hard disk drive.

4. The method of claim 1, wherein the erasure head is moved while the disk is being erased.

5. A test stand to erase a disk of a hard disk drive, comprising:
   a table;
   a moving stage coupled to said table; and,
   a first erasure head coupled to said table and emanates a magnetic field that spins the disk of a moving hard disk drive.

6. The test stand of claim 5, further comprising second, third and fourth erasure heads coupled to said table.

7. The test stand of claim 5, further comprising an erasure head moving stage.

* * * * *